| United States Patent [19] | [11] Patent Number: 4,479,975 |
|---|---|
| Szczesniak et al. | [45] Date of Patent: Oct. 30, 1984 |

[54] FRUIT FLAVORED BEVERAGES

[75] Inventors: Alina S. Szczesniak, Mt. Vernon, N.Y.; Anne F. Schenz, Haworth, N.J.

[73] Assignee: General Foods Corporation, White Plains, N.Y.

[21] Appl. No.: 457,816

[22] Filed: Jan. 13, 1983

[51] Int. Cl.³ .............................................. A23L 2/00
[52] U.S. Cl. .................................... 426/590; 426/650
[58] Field of Search ................... 426/590, 591, 32, 34, 426/656, 657, 650

[56] References Cited

U.S. PATENT DOCUMENTS

| 3,395,021 | 7/1968 | Glicksman et al. | 426/98 |
| 3,510,310 | 5/1970 | Breckwoldt | 426/548 |
| 3,649,298 | 3/1972 | Kreevoy et al. | 426/591 |
| 3,736,150 | 5/1973 | Basso et al. | 426/590 |
| 3,876,806 | 4/1975 | Hempenius et al. | 426/590 |
| 3,970,520 | 7/1976 | Feldman et al. | 426/32 |
| 4,031,259 | 6/1977 | Lugay et al. | 426/548 |
| 4,130,555 | 12/1978 | Ohtsuka et al. | 426/590 |

FOREIGN PATENT DOCUMENTS 2046501  3/1972  Fed. Rep. of Germany ...... 426/590

*Primary Examiner*—Raymond Jones
*Assistant Examiner*—Elizabeth C. Weimar
*Attorney, Agent, or Firm*—Thomas A. Marcoux; Linn I. Grim; Daniel J. Donovan

[57] ABSTRACT

A method is disclosed for producing an enhanced flavor impact and improved mouthfeel character in an acidic fruit-flavored beverage comprising adding a protein hydrolyzate at a level of from 0.1 to 1 gram per liter on an as-consumed basis. The protein hydrolyzate must be bland and free from appreciable off-flavors or off-odors and must be soluble in water at pH 2.5 to 4 and preferably also soluble in cold water.

12 Claims, No Drawings

FRUIT FLAVORED BEVERAGES

TECHNICAL FIELD

The invention relates to beverages and more particularly to the addition of certain chemical compounds or compositions which have been found to have utility in the alteration of flavor or mouthfeel characteristics of said beverages.

BACKGROUND ART

In the food industry there is a constant demand for the production of additives, whether naturally occurring or synthetic, which are capable of imparting, supplementing or improving the flavor or mouthfeel characteristics of the foodstuffs. It is common in some segments of the industry to add flavor agents to enhance or bring out a desirable characteristic in products and by so doing, render the product more desirable from a consumer preference standpoint.

U.S. Pat. No. 3,395,021 issued to Glicksman et al. teaches a dry fruit flavor beverage mix containing edible acids such as citric, tartaric, adipic, and formic acids. These acids in combination with a gum system produce a product which is similar in flavor and mouthfeel to a fresh fruit beverage. The acids provide tartness in the reconstituted beverage.

U.S. Pat. No. 3,736,150 entitled "Beverage Containing Egg Albumen and Amino Acid" issued to Basso et al. teaches the addition of egg albumen and an amino acid (glycine) to a dry beverage mix, where the egg albumen and glycine are present as the major sources of protein. The glycine also serves an additional function as a flavor enhancer, masking the objectionable egg odor and taste, resulting in a product that is substantially indistinguishable from a similar beverage with all the protein omitted.

U.S. Pat. No. 3,649,298 entitled "Carbonation Concentrates For Beverages and Process of Producing Carbonated Beverages" issued to Kreevoy teaches a dry beverage mix containing n-carboxy-amino acid anhydride in combination with the disodium salts of n-carboxy-amino acid producing a carbonated beverage mix.

U.S. Pat. No. 3,510,310 entitled "Artifically Sweetened Beverages and Mixtures Thereof" issued to Breckwoldt teaches a dry beverage mix comprising an edible water-soluble amino carboxylic acid (e.g. glycine, lysine, methionine, etc.). This mix is reconstituted to provide a beverage having a taste and texture similar to the beverage sweetened with sugar. This invention purports to solve the adverse problem associated with artificially sweetened beverages in overcoming the lack of texture and mouthfeel that is inherent in such a beverage.

U.S. Pat. No. 4,031,259 entitled "Process of Preparing Nutritive Sweetening Compositions" issued to Lugay et al. teaches a process for improving the solubility and stability of dipeptide nutritive sweeteners comprising co-drying an amino acid derived nutritive sweetener with a low molecular weight polypeptide, preferably an enzymatically hydrolyzed non-gelatin protein, wherein the ratio of sweetener to polypeptide is from about 1:1 to about 1:20.

On analysis, fruit juices, in particular orange juices are known to contain as much as 9% proteinaceous materials on a dry weight total solids basis. The individual amino acids themselves are sweet, sour, bitter or bland. The prior art neither teaches nor appreciates that either amino acids, peptides or polypeptides are important flavor contributors to fruit juices, or the possibility that they could be utilized to produce an enhanced flavor impact and an improved mouthfeel character in a fruit-flavored dry beverage mix at a low level of incorporation.

The commonly-assigned U.S. Patent Application Ser. No. 435,162 filed on Oct. 19, 1982 which is entitled Amino Acids as Dry Beverage Mix Ingredients in the name of Schenz teaches a method of producing an enhanced flavor impact and an improved mouthfeel character in a dry beverage mix comprising the addition of amino acids. The specific amino acids which produce the effect were l-proline, l-asparagine, l-aspartic acid, l-arginine, γ-amino-n-butyric acid, l-alanine, l-glutamine and combinations thereof. The level of incorporation of the amino acids in a dry mix varies from 0.1% to 8% on a dry weight basis. When reconstituted with water the level of amino acids commonly varies from 0.1 to 8 grams per liter on an as-consumed basis.

There has been a constant demand in the food art for the production of a formulated beverage, whether it be a dry beverage mix, ready-to-drink beverage or beverage concentrate which would contain a flavor and mouthfeel more akin to a real fruit juice.

DISCLOSURE OF THE INVENTION

This invention relates to a method of producing an enhanced flavor impact and an improved mouthfeel character in an acidic fruit-flavored beverage comprising the addition of a protein hydrolyzate. The hydrolyzate chosen must be bland and possess no appreciable off-flavors or off-odors. The protein hydrolyzate also must be soluble in water at pH 2.5-4 and preferably soluble in cold water. Both chemically hydrolyzed and enzymatically hydrolyzed protein hydrolyzates may be utilized in the present invention. The preferable protein hydrolyzates are enzymatically hydrolyzed protein hydrolyzates because of their blandness, lack of off-flavors and off-odors.

The protein source may be derived from animal or vegetable matter or combinations thereof. Exemplary of protein sources which may be employed are fish, meat, soy, wheat, corn, egg albumin, milk proteins, plant proteins, keratin, gelatin, single cell proteins and mixtures thereof. The preferable protein sources for the preparation of the protein hydrolyzates are gelatin and soy. Suitable protein hydrolyzates are Novo APP 108, Novo PP 033 SD, Gunther's Acid Soluble Vegetable Protein 1535 and Gunther's K-88 Whipping Aid all being derived from a soy protein source and Krafts's Humko Sheffield Primatone G being derived from a gelatin protein source.

The resulting reconstituted beverage has a significantly improved aroma, flavor and mouthfeel characteristics and matches closely the sensory properties of the natural fruit juice (e.g. orange). The presence of the protein hydrolyzate in the beverage functions to organoleptically produce an overall blending of aromatic flavors and basic tastes which yields a closer resemblance to real fruit juice. The effect of the protein hydrolyzate is similar, but superior, to that of the addition of amino acids as taught in the previously mentioned U.S. patent application. This is particularly significant because in the referenced U.S. application, the free amino acid was believed to be contributing the beneficial effect. Viewed against this teaching, it is surprising that a protein hydrolyzate which contains a majority of peptides and polypeptides and very few amino acids would produce the same effect much less a more pronounced effect. The protein hydrolyzate, because of its ability to act as a surface tension reducing agent and a foam former, provides flavor blending, better body and a foaming characteristic of freshly squeezed orange juice. The foam contributes to better appearance, increased glass aroma and better flavor delivery. The invention significantly decreases sensory differences between compounded beverages and fresh fruit juices. Additionally, the incorporation of a protein hydrolyzate is significantly more cost-effective as compared to the incorporation of amino acids.

The protein hydrolyzates previously identified can be added to a ready-to-drink beverage, a dry beverage mix or a beverage concentrate and they will produce an enhanced flavor impact and an improved mouthfeel character in each of these beverage systems. The level of incorporation of the protein hydrolyzate in the beverage on an as-consumed basis varies from 0.1 to 1 grams per liter, preferably from 0.2 to 0.4 grams per liter. When it is incorporated into a dry beverage mix, the protein hydrolyzate will be present at a level of from 0.07% to 0.7% on a dry weight basis, preferably from 0.14% to 0.3%.

The beverages of the present invention in addition to containing the protein hydrolyzate will contain sweeteners, flavoring agents, clouding agents, dyes, antioxidants, buffering agents, nutritional additives (e.g. vitamins) and other ingredients which have been known to be present in these beverages.

The following examples are provided as illustrations of the flavoring composition of the present invention.

EXAMPLE I

Three orange-flavored, dry beverage mixes were prepared containing the following ingredients as reported in Table I. Sample 1 was a control; Sample 2 contained amino acids in addition to the control formula and Sample 3 contained a protein hydrolyzate added to the control formula.

TABLE 1

| Ingredients | Sample 1 (Control) | Sample 2 (with amino acids) | Sample 3 (with protein hydrolyzate) |
|---|---|---|---|
| | Dry Beverage Mix (in grams) | | |
| Sugars | 124.0 | 124.0 | 124.0 |
| Food Grade Acids | 8.1 | 8.1 | 8.1 |
| Buffer Salts | 3.2 | 3.2 | 3.2 |
| Amino Acids | — | 6.6 | — |
| Vitamins | 0.4 | 0.4 | 0.4 |
| Artificial Colors | 0.8 | 0.8 | 0.8 |
| Clouding Agent | 3.1 | 3.1 | 3.1 |
| Thickening Agents | 1.4 | 1.4 | 1.4 |
| Protein Hydrolyzate Novo APP 108 | — | — | 0.2 |
| Orange Flavors | 1.4 | 1.4 | 1.4 |
| Total (g) | 142.4 | 149.0 | 142.6 |

Sample 2 (the amino acid containing dry beverage mix) contained 4.4% amino acids on a dry weight basis and Sample 3 (the protein hydrolyzate containing dry beverage mix) contained 0.14% protein hydrolyzate on a dry weight basis. All samples were reconstituted with water to make one liter of the beverage. The beverages were stirred until all material had completely dissolved. Sample 2 contained 6.6 grams per liter of amino acids as-consumed, Sample 3 contained 0.2 grams per liter of protein hydrolyzate as-consumed and the control (Sample 1) contained neither.

The three samples were evaluated by a benchtop trained taste panel and their sensory characteristics are reported below in Table 2.

TABLE 2

| | Sensory Characteristics |
|---|---|
| Sample 1 (Control) | Like orange candy. Very sweet with high tartness. Slightly watery mouthfeel, thin. |
| Sample 2 (with amino acids) | Like somewhat tart orange juice. Well-blended sweetness and sourness. Sour and bitter aftertastes. Slightly thicker mouthfeel than 1. |
| Sample 3 (with protein hydrolyzate) | More orange juice-like than 2. Sweeter and better blended than 2. No sour or bitter aftertastes. Thicker and less watery mouthfeel than 2. |

EXAMPLE 2

Ready-to-drink beverages were prepared which contained the levels of ingredients as indicated in Table III. The only difference between the two beverage samples was the addition of the gelatin derived protein hydrolyzate to the second beverage sample.

TABLE III

| | Control | Control plus protein Hydrolyzate |
|---|---|---|
| Sugar | 124.0 grams | 124.0 grams |
| Food Grade Acids | 8.1 | 8.1 |
| Buffer Salts | 3.2 | 3.2 |
| Vitamins | 0.7 | 0.7 |
| Artificial Colors | 0.04 | 0.04 |
| Clouding Agent | 3.1 | 3.1 |
| Thickening Agent | 1.4 | 1.4 |
| Primatone G. Protein Hydrolyzate | — | 0.2 |
| Mandarin Flavor Emulsion | 1.76 | 1.76 |
| Water | 910 ml | 910 ml |

Preparation: Add ingredients to water with agitation. Stir till dissolved. Heat to 185° F. for 15 seconds. Pack aseptically in Brik-Pak containers.

Evaluation: Bench-top organoleptic evaluation showed the beverage which incorporated the protein hydrolyzate to be sweeter, thicker, better in sweet/sour blending, higher in aroma, and less bitter and sour in aftertaste.

We claim:

1. A method for producing an acidic fruit-flavored beverage with an enhanced flavor impact and improved mouthfeel character comprising the addition of a protein hydrolyzate to said beverage, said protein hydrolyzate being bland, possessing no appreciable off-flavors or off-odors and said hydrolyzate being soluble in water a pH 2.5 to 4, said hydrolyzate being present in amounts from about 0.1 to about 1 gram per liter on an as-consumed basis.

2. The method of claim 1 wherein said protein hydrolyzate is derived from a protein source which is selected from the group consisting of fish, meat, soy, wheat, corn, egg albumin, milk proteins, plant proteins, keratin, gelatin, single cell proteins and combinations thereof.

3. The method of claim 2 wherein the protein hydrolyzate is an enzymatically hydrolyzed protein hydrolyzate.

4. The method of claim 2 wherein the protein source is soy or gelatin.

5. The method of claim 2 wherein said protein hydrolyzate is additionally soluble in cold water.

6. The method of claim 1 wherein the level is from 0.2 to 0.4 grams per liter on an as-consumed basis.

7. The method of claim 1 wherein said acidic fruit-flavored beverage is a ready-to-drink beverage.

8. The method of claim 7 wherein the level is from 0.2 to 0.4 grams per liter on an as-consumed basis.

9. The method of claim 1 wherein said acidic fruit-flavored beverage is a beverage concentrate.

10. The method of claim 9 wherein the level is from 0.2 to 0.4 grams per liter on an as-consumed basis.

11. A method of producing a dry beverage mix which upon reconstitution with water yields an acidic, fruit-flavored beverage with an enhanced flavor impact and improved mouthfeel character comprising the addition of a protein hydrolyzate to said dry beverage mix, said protein hydrolyzate being bland, possessing no appreciable off-flavors or off-odors, said hydrolyzate being soluble in water at pH 2.5 to 4, said protein hydrolyzate being incorporated at a level of from 0.07% to 0.7% on a dry weight basis.

12. The method of claim 11 wherein the protein hydrolyzate is incorporated at a level of from 0.14% to 0.3% on a dry weight basis.

* * * * *